(No Model.)

J. C. CRAWFORD.
VEHICLE SPRING.

No. 244,380. Patented July 19, 1881.

Witnesses:
Frank McClintock,
W. H. McClintock,

Inventor.
J. C. Crawford

UNITED STATES PATENT OFFICE.

JOHN C. CRAWFORD, OF DOUGLASS, IOWA.

VEHICLE-SPRING.

SPECIFICATION forming part of Letters Patent No. 244,380, dated July 19, 1881.

Application filed May 9, 1881. (No model.)

*To all whom it may concern:*

Be it known that I, JOHN C. CRAWFORD, of Douglass, Fayette county, Iowa, have invented a new and useful Improvement in Vehicle-Springs, of which the following is a specification.

My invention consists in the use of a coiled spring with suitable means of attaching the body or box of the vehicle to the same, and a method of securing the ends of the steel band forming the coiled spring without weakening it by holes for bolts or rivets. I attain these objects by means of the mechanism illustrated in the accompanying drawings, in which—

Figure 1:
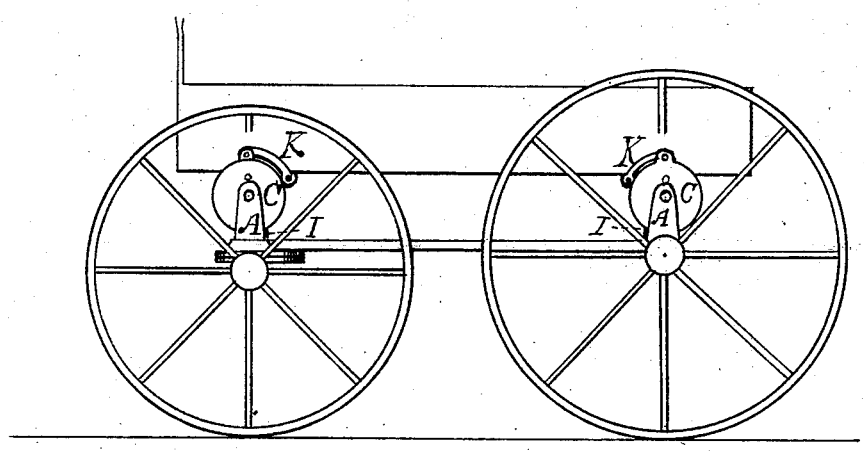
Figure 2:
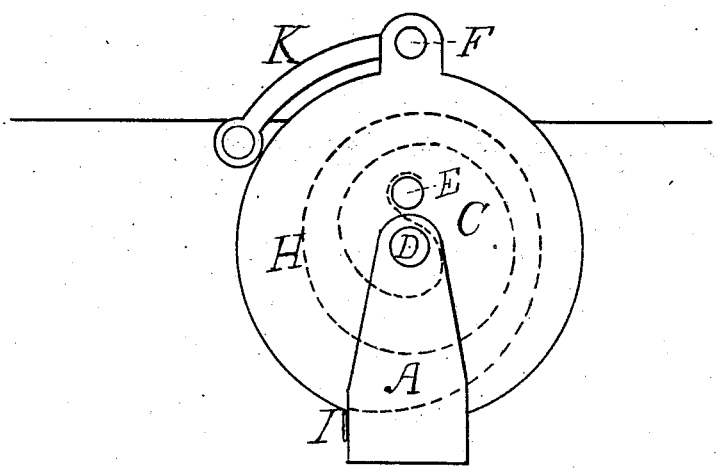

Figure 1 shows the spring applied to a wagon, and Fig. 2 a detail view of one of the springs.

Similar letters refer to similar parts in both views.

A is a standard bolted or otherwise firmly attached to the axle of the vehicle. Two similar circular plates, C, are firmly joined together (leaving a space between them a trifle larger than the width of the coiled spring) by means of three pins, D E F, the center one, D, projecting so as to allow the plates to revolve in bearings in the upper part of the standard A. A steel ribbon or band is bent at one end, H, so as to fit around and between the pins D and E, and then coiled, as shown by the dotted line in Fig. 2, and the other end bent down, so as to catch against the base of the standard A at I. From the pin F a link or strap, K, connects the body or box of the vehicle with the spring.

The action of the spring is simple. A load in the vehicle tends by means of the links K to revolve the plates on their bearings, which is resisted by the action of the coiled spring.

Having thus described my invention, what I claim as new, and desire to secure by Letters Patent, is—

A vehicle-spring formed of two plates connected by pins and revolving in bearings of a standard with a coiled steel band secured between them, and a strap or link connecting the plates with the body or box of the vehicle, substantially as shown and described.

J. C. CRAWFORD.

Witnesses:
FRANK McCLINTOCK,
W. H. McCLINTOCK.